US00RE45773E

(19) United States
(12) Reissued Patent
Houston et al.

(10) Patent Number: US RE45,773 E
(45) Date of Reissued Patent: Oct. 20, 2015

(54) VARYING OPERATION OF A VOLTAGE REGULATOR, AND COMPONENTS THEREOF, BASED UPON LOAD CONDITIONS

(71) Applicant: INTERSIL AMERICAS INC., Milpitas, CA (US)

(72) Inventors: Michael J. Houston, Cary, NC (US); Christopher S. Saunders, Raleigh, NC (US)

(73) Assignee: Intersil Americas Inc., Milpitas, CA (US)

(21) Appl. No.: 14/170,025

(22) Filed: Jan. 31, 2014

Related U.S. Patent Documents

Reissue of:
(64) Patent No.: 8,125,207
Issued: Feb. 28, 2012
Appl. No.: 12/952,954
Filed: Nov. 23, 2010

U.S. Applications:
(63) Continuation of application No. 12/192,234, filed on Aug. 15, 2008, now Pat. No. 7,898,236.

(60) Provisional application No. 61/075,149, filed on Jun. 24, 2008, provisional application No. 61/043,790, filed on Apr. 10, 2008.

(51) Int. Cl.
*G05F 1/40* (2006.01)
*H02M 3/158* (2006.01)

(52) U.S. Cl.
CPC ..... *H02M 3/1584* (2013.01)

(58) Field of Classification Search
CPC . H02M 3/157; H02M 3/1582; H02M 3/1584; H02M 3/1588
USPC ..... 323/272, 283, 284, 285
See application file for complete search history.

(56) References Cited

U.S. PATENT DOCUMENTS 4,509,190 A * 4/1985 Spector ..... 381/61
4,631,471 A 12/1986 Fouad et al.
5,204,809 A 4/1993 Andresen (Continued)

FOREIGN PATENT DOCUMENTS

JP 56023725 3/1981
WO 2006026674 3/2006

OTHER PUBLICATIONS

U.S. Patent and Trademark Office, "Notice of Allowance ", "from U.S. Appl. No. 12/192,234", Aug. 6, 2010, pp. 1-8, Published in: US.

(Continued)

*Primary Examiner* — Linh M Nguyen
(74) *Attorney, Agent, or Firm* — Fogg & Powers LLC

(57) ABSTRACT

A method for operating a voltage regulator controller, for use in a voltage regulator including coupled inductors, is provided as follows. A first signal is generated for driving a first switch of the voltage regulator. A second signal is generated driving a first switch of the voltage regulator. The voltage regulator determines whether a light-load condition exists. Upon determining the existence of a light-load condition, adjusting the phase difference between said first and second signals so that the first and second signals are approximately in-phase.

32 Claims, 2 Drawing Sheets

(56) References Cited

U.S. PATENT DOCUMENTS

| | | | | |
|---|---|---|---|---|
| 5,414,401 | A | 5/1995 | Roshen et al. | |
| 5,631,822 | A | 5/1997 | Silberkleit et al. | |
| 5,764,500 | A | 6/1998 | Matos | |
| 5,790,005 | A | 8/1998 | Santi et al. | |
| 5,852,557 | A | 12/1998 | Woodward | |
| 5,982,160 | A | 11/1999 | Walters et al. | |
| 6,018,468 | A | 1/2000 | Archer et al. | |
| 6,272,023 | B1 | 8/2001 | Wittenbreder | |
| 6,278,263 | B1 | 8/2001 | Walters et al. | |
| 6,362,986 | B1 | 3/2002 | Schultz et al. | |
| 6,417,753 | B1 | 7/2002 | Wolf et al. | |
| 6,462,525 | B1 | 10/2002 | Chen | |
| 6,549,436 | B1 | 4/2003 | Sun | |
| 6,593,724 | B1 | 7/2003 | Chen | |
| 6,686,727 | B2 | 2/2004 | Ledenev et al. | |
| 6,696,823 | B2 | 2/2004 | Ledenev et al. | |
| 6,728,263 | B2 | 4/2004 | Joy et al. | |
| 6,873,237 | B2 | 3/2005 | Chandrasekaran et al. | |
| 6,885,274 | B2 | 4/2005 | Hsu et al. | |
| 6,980,077 | B1 | 12/2005 | Chandrasekaran et al. | |
| 6,995,548 | B2 | 2/2006 | Walters et al. | |
| 7,002,325 | B2 | 2/2006 | Harris et al. | |
| 7,005,835 | B2 | 2/2006 | Brooks et al. | |
| 7,046,523 | B2 | 5/2006 | Sun et al. | |
| 7,109,691 | B2 | 9/2006 | Brooks et al. | |
| 7,136,293 | B2 | 11/2006 | Petkov et al. | |
| 7,138,789 | B2 | 11/2006 | Moussaoui et al. | |
| 7,233,132 | B1 | 6/2007 | Dong et al. | |
| 7,239,116 | B2 * | 7/2007 | Tang | 323/282 |
| 7,242,172 | B2 | 7/2007 | Carlson et al. | |
| 7,301,314 | B2 | 11/2007 | Schuellein et al. | |
| 7,327,128 | B2 | 2/2008 | Dinh | |
| 7,342,383 | B1 | 3/2008 | Song | |
| 7,352,269 | B2 | 4/2008 | Li et al. | |
| 7,394,233 | B1 | 7/2008 | Trayling et al. | |
| 7,449,867 | B2 | 11/2008 | Wu et al. | |
| 7,466,116 | B2 * | 12/2008 | Sato et al. | 323/285 |
| 7,468,899 | B1 | 12/2008 | Hopper et al. | |
| 7,514,909 | B2 | 4/2009 | Burstein et al. | |
| 7,521,913 | B2 * | 4/2009 | Tang et al. | 323/283 |
| 7,548,046 | B1 | 6/2009 | Stratakos | |
| 7,638,991 | B1 * | 12/2009 | Kobayashi | 323/272 |
| 7,675,277 | B2 * | 3/2010 | Gotzenberger | 323/272 |
| 7,893,669 | B2 * | 2/2011 | Osterhout et al. | 323/272 |
| 7,898,236 | B2 * | 3/2011 | Houston et al. | 323/284 |
| 2003/0197585 | A1 | 10/2003 | Chandrasekaran et al. | |
| 2003/0198067 | A1 | 10/2003 | Sun et al. | |
| 2003/0214274 | A1 * | 11/2003 | Lethellier | 323/272 |
| 2004/0113741 | A1 | 6/2004 | Li et al. | |
| 2005/0024179 | A1 | 2/2005 | Chandrasekaran et al. | |
| 2005/0151614 | A1 | 7/2005 | Dadafshar | |
| 2005/0286270 | A1 | 12/2005 | Petkov et al. | |
| 2006/0038549 | A1 | 2/2006 | Mehrotra et al. | |
| 2006/0038650 | A1 | 2/2006 | Mehrotra et al. | |
| 2006/0145800 | A1 | 7/2006 | Dadafshar et al. | |
| 2006/0187684 | A1 | 8/2006 | Chandrasekaran et al. | |
| 2006/0197510 | A1 | 9/2006 | Chandrasekaran | |
| 2006/0239046 | A1 * | 10/2006 | Zane et al. | 363/65 |
| 2007/0273349 | A1 | 11/2007 | Wei et al. | |
| 2008/0303495 | A1 | 12/2008 | Wei et al. | |
| 2008/0309299 | A1 | 12/2008 | Wei et al. | |
| 2008/0315982 | A1 | 12/2008 | Wei et al. | |

OTHER PUBLICATIONS

U.S. Patent and Trademark Office, "Supplemental Notice of Allowability", "from U.S. Appl. No. 12/192,234", Sep. 29, 2010, pp. 1-5, Published in: US.

U.S. Patent and Trademark Office, "Notice of Allowance", "from U.S. Appl. No. 12/192,234", Dec. 6, 2010, pp. 1-12, Published in: US.

U.S. Patent and Trademark Office, "Notice of Allowance", "from U.S. Appl. No. 12/952,954", Aug. 31, 2011, pp. 1-5, Published in: US.

U.S Patent and Trademark Office, "Notice of Allowance ", "from U.S. Appl. No. 12/952,954", Oct. 28, 2011, pp. 1-10, Published in: US.

U.S Patent and Trademark Office, "Office Action", "from U.S. Appl. No. 12/952,954", Apr. 14, 2011, pp. 1-15, Published in: US.

Xiao et al., "Parasitic Resistance Current Sensing Topology for Coupled Inductors", "International Journal of Electronics", Jan. 2009, pp. 51-61, vol. 96, No. 1, Publisher: Taylor & Francis.

Xu et al., "Analysis by Finite Element Method of a Coupled Inductor Circuit Used as Current Injection Interface", "1996 IEEE Workshop on Computers in Power Electronics", Aug. 11-14, 1996, pp. 147-151, Publisher: IEEE, Published in: US.

Wong et al., "Investigating Coupling Inductors in the Interleaving QSW VRM", "Fifteenth Annual IEEE Applied Power Electronics Conference and Exposition", Feb. 6-10, 2000, pp. 973-978, vol. 2, Publisher: APEC, Published in: New Orleans, Louisiana.

Maksimovic, Dragan and Robert Erickson, "Modeling of Cross-Regulation in Converters Containing Coupled Inductors", "13th Annual Applied Power Electronics Conference and Exposition", Feb. 15-19, 1998, pp. 350-356, Publisher: IEEE.

Czogalla et al., "Automotive Application of Multi-Phase Coupled-Inductor DC-DC Converter", "2003 IEEE Industry Applications Conference", 2003, pp. 1524-1529, vol. 3, Publisher: IEEE.

Dixon, Lloyd, "Coupled Inductor Design", "Coupled Inductor Design", May 1993, pp. 8-1 thru 8-4, Publisher: Unitrode Corporation.

Finn et al., "Applications and equivalent models for coupled inductor parallel interleaved converters", Sep. 26-29, 2004, pp. 1-8, Published in: Brisbane, AU.

Hoke et al., "An Improved Two-Dimensional Numerical Modeling Method for E-Core Transformers", "IEEE Applied Power Electronics Conference", Mar. 2002, Publisher: IEEE.

Li et al., "Coupled-Inductor Design Optimization for Fast-Response Low-Voltage DC-DC Converters", "17th Annual IEEE Applied Power Electronics Conference and Exposition", Mar. 10-14, 2002, pp. 817-823, Publisher: IEEE.

Li et al., "Using Coupled Inductors to Enhance Transient Performance of Multi-Phase Buck Converters", "19th Annual IEEE Applied Power Electronics Conference and Exposition", Feb. 22-26, 2004, pp. 1289-1293, vol. 2, Publisher: IEEE.

Park et al., "Modeling and Analysis of Multi-Interphase Transformers for Connecting Power Converters in Parallel", "28th Annual IEEE Power Electronics Specialists Conference", 1997, pp. 1164-1170, Publisher: IEEE.

Wu et al., "Multi-Phase Buck Converter Design with Two-Phase Coupled Inductors", 2006, pp. 487-492, Publisher: IEEE.

* cited by examiner

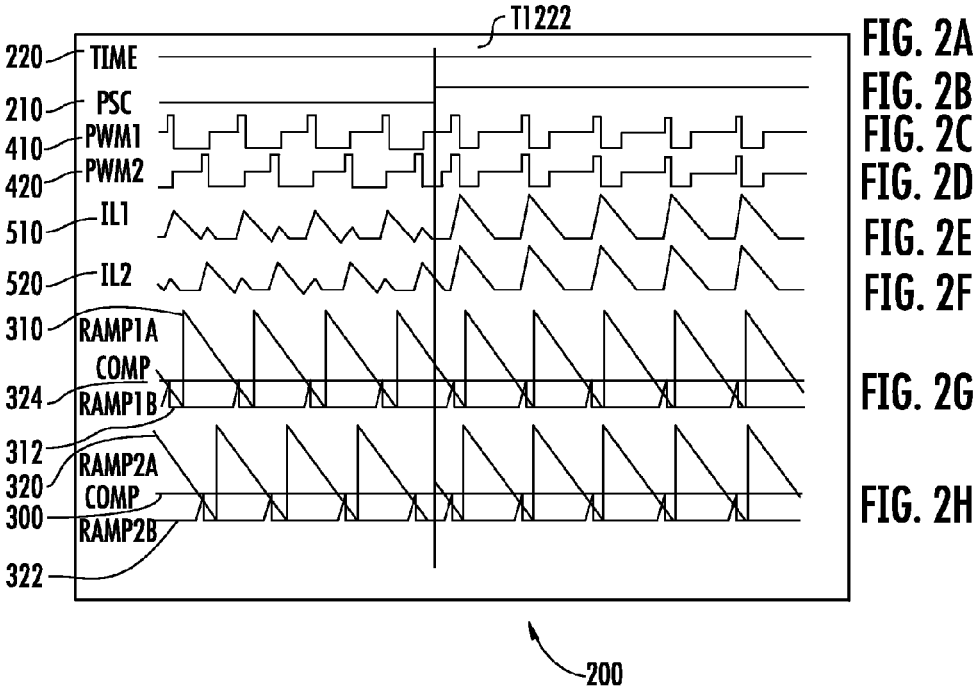
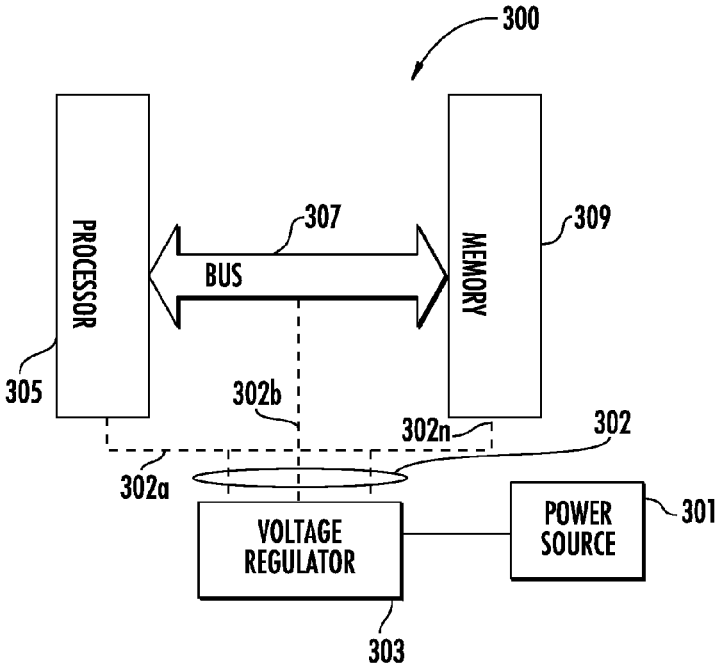
FIG. 3

VARYING OPERATION OF A VOLTAGE REGULATOR, AND COMPONENTS THEREOF, BASED UPON LOAD CONDITIONS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CLAIM OF PRIORITY

This application *is a reissue of U.S. application Ser. No. 12/952,954, filed on Nov. 23, 2010 now U.S. Pat. No. 8,125, 207 issued Feb. 28, 2012, which* is a continuation of U.S. application Ser. No. 12/192,234, (the '234 application), filed Aug. 15, 2008 *now U.S. Pat. No. 7,898,236 issued Mar. 1, 2011*, which claims the benefit of priority *of* U.S. Provisional Applications, each respectively having Ser. Nos. 61/043,790 (filed Apr. 10, 2008) and 61/075,149 (filed Jun. 24, 2008)[.], both of which are herein incorporated by reference.

RELATED APPLICATIONS

This application is related to U.S. Applications, each respectively having Ser. No. 11/519,516 (filed Sep. 12, 2006), Ser. No. 12/136,014 (filed Jun. 9, 2008), Ser. No. 12/136,018 (filed Jun. 9, 2008), and Ser. No. 12/136,023, all of which are incorporated by reference.

BRIEF DESCRIPTION OF THE DRAWINGS

One or more embodiments and features and benefits thereof may be understood upon review of the following detailed description together with the accompanying drawings, in which:

FIGS. 2A-H illustrates exemplary signal waveforms generated by the embodiment of the voltage regulator illustrated in FIG. 1A.

FIG. 3 illustrates a system that may incorporate an embodiment of the voltage regulator whose operation varies based upon load conditions.

DETAILED DESCRIPTION

Figure 1A:
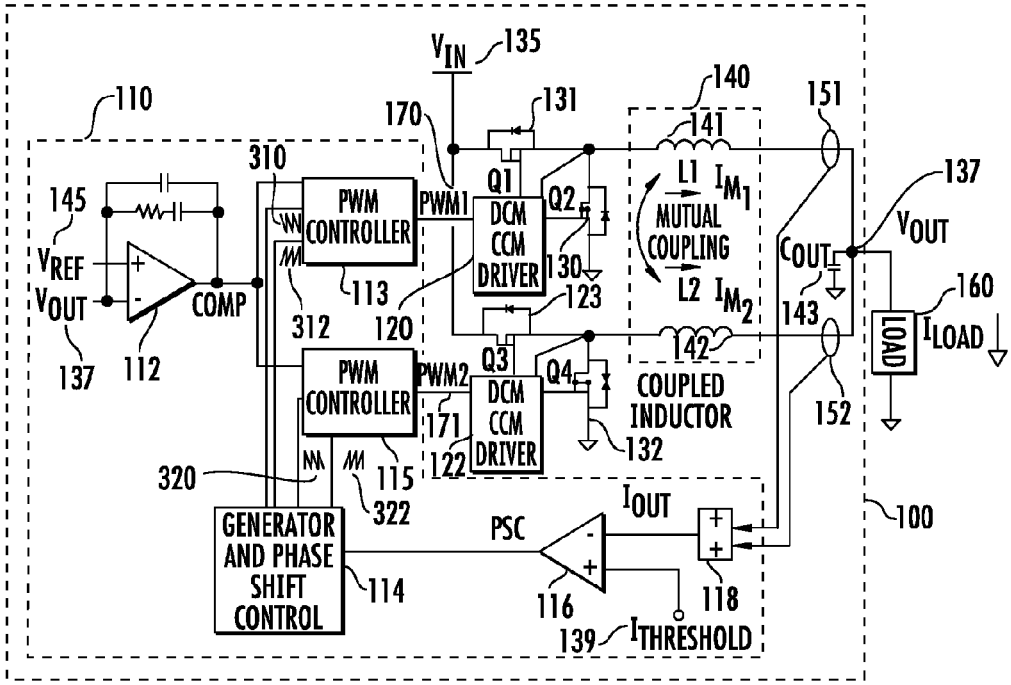
FIG. 1A illustrates a schematic of an embodiment of a voltage regulator whose operation varies based upon load conditions.

The following description is presented to enable one of ordinary skill in the art to make and use one or more embodiments of the present invention as provided within the context of a particular application and its requirements. Various modifications to the disclosed embodiment(s) will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Some voltage regulators ('VRs') convert a first DC voltage to a higher or lower second DC voltage. Such VRs may enhance conversion efficiency to reduce or eliminate wasted power.

It may be important to maintain high VR conversion efficiency under light-load conditions (i.e. when the load consumes relatively low power), e.g. to maintain battery life. VR efficiency under light-load conditions may be enhanced in different ways.

One technique for enhancing efficiency under light-load conditions is by 'phase dropping,' which is when a VR inactivates one or more phase(s) (i.e., make some phase(s) inactive) during light-load conditions.

Another technique to further enhance efficiency under light-load conditions is to implement the VR with a diode-emulation control (also referred to as synchronous rectification, or discontinuous conduction mode, or 'DCM', control). A DCM control circuit prevents sinking current, and removing energy, from the VR's capacitance 143 (FIG. 1), Cout, during light-load conditions. This also may further improve VR conversion efficiency. One technique for implementing DCM control circuitry is illustrated in U.S. Pat. No. 6,643, 145 (issued Jul. 26, 2002) which is hereby incorporated by reference. Other DCM control circuitry may be used; known conventional alternatives are not illustrated here for the sake of brevity.

To implement a DCM control scheme in a VR, the VR is provided a signal indicating that a light-load condition exists or will exist. In one embodiment, the load, e.g. a microprocessor, generates a power-state indicator (PSI#). For example, this may occur in an implementation of Intel Corporation's VR11 specification, e.g. VR11.1. The PSI# is provided to the VR controller to signify a light-load condition. The "#" symbol appended to a signal name denotes negative logic in which PSI#=logic 1 (asserted high) for normal operation, and PSI#=logic 0 (asserted low) for light-load conditions. The power-state indicator is analogous to the PSC signal described below.

Alternatively, the light-load condition may be determined by measuring the current to the load. The measured current is compared to a threshold current level. If the measured current is below the threshold current level, then an appropriate signal is generated and provided to the VR controller to indicate a light-load condition.

To further improve light-load efficiency, the VR may be implemented with coupled inductors, such as a two (2) phase VR with two (2) coupled inductors. Coupled-inductor VRs may also have the benefit of reducing the space occupied by such VRs in comparison to corresponding, non-coupled-inductor VRs. Coupled inductors are two or more inductors whose windings are magnetically coupled so that current flowing in one inductor affects the current flowing in one or more other inductors. For example, a pair of coupled inductors may be fabricated by winding two inductors about the same magnetic core. A magnetic core, however, is not required. The measure of coupling (or 'mutual coupling') between a pair of inductors is known as mutual inductance, M.

When a VR having a fixed PWM switching frequency (otherwise known as 'FSW') operates in DCM mode in the lightest-load conditions the energy supplied to the capacitance 143, Cout, may become greater than the energy consumed by the load. In this case the controller will adjust and force the modulator to skip PWM pulses in some switching cycles.

In a two (2) phase pulse-width-modulation ('PWM') VR using coupled inductors and operating in a light-load condition, the drive signals for the two phases may be interleaved and approximately 180 degrees phase shifted from each other. This interleaving may reduce peak-to-peak current in each inductor, may reduce the magnitude of VR peak-to-peak output ripple current, and, therefore, may reduce the magnitude of VR output voltage ripple, reduce the capacitance 143, Cout, or some combination of the foregoing. When the VR controller enters DCM and the load current reduces sufficiently to force the modulator to skip PWM pulses, the output ripple voltage may become erratic and increase beyond specified peak-to-peak limits.

The two interleaved coupled phases create inductor currents that do not have a singular triangular waveform (in one switching cycle) as is the case for a two-phase implementation using conventional (non-coupled) inductors. Rather, the two interleaved phases generate inductor currents with a wave form that has two peaks and two valleys during one switching cycle.

This inductor-current waveform may complicate the implementation of the DCM control circuitry and cause inaccurate zero current detection, in DCM and Continuous Conduction Mode ('CCM'), and reduce efficiency in DCM operation.

The following describes an embodiment of a technique that may solve some or all of the foregoing problems. This embodiment may also reduce the magnitude of output voltage ripple under light-load conditions.

FIG. 1A illustrates an embodiment of a Voltage Regulator ('VR') 100, which includes a VR controller 110, two driver circuits ('drivers') 120, 122, two switches 130, 131 and 132, 133, e.g., pairs of field effect transistors ('FETs'), two inductors (L1 and L2) 141, 142 that are coupled, output current sensors 151, 152, a capacitance 143, Cout, and other conventional components that are omitted for brevity. Each switch, alternatively, may be implemented by one or more of other devices, e.g., bipolar transistors, diodes, or combinations of a variety of devices; known conventional alternatives are not illustrated for the sake of brevity. The switches 131 and 133 are coupled to a DC supply voltage node 135, Vin. The inductors 141, 142 and the capacitance 143 form a filter that may reduce either the magnitude of the Iload ripple in comparison to such ripple in a conventional non-coupled inductor VR or reduce the transient response at Vout in comparison to a conventional non-coupled inductor VR, or a trade off of some lesser reduction of both Iload ripple and the transient response at Vout. The process for designing such a filter and making such a trade-off is not disclosed for the sake of brevity.

A load 160 is coupled to the output 137 of the VR 100. The load 160 may be one or more electrical devices, e.g. a processor, memory, bus, or the combination thereof.

The drivers 120, 122 provide an interface between the VR controller 110, operating at relatively low voltage and current levels, and the switches 130, 132 operating at relatively high voltages and currents; the drivers 120, 122 permit the VR controller 110 to turn the switches 130, 132 on and off. The drivers 120, 122 also include circuitry to implement CCM and DCM operation based upon receiving the appropriate PWM signals 410, 420, as is subsequently described. Exemplary drivers are Intersil Corporation's ISL6612, ISL6614, ISL6609, ISL6610, ISL6622, and ISL6620 drivers whose data sheets are herein incorporated by reference.

The generator and phase shift controller 114 may include one or more of the following: a signal generator, a phase shifter, and/or a switch. The implementation for the generator and phase shift controller is not illustrated for the sake of brevity.

The generator and phase shift controller 114 may generate analog ramp signal(s) provided to each PWM controller and are used to generate PWM signals. The generator and phase shift controller 114 may generate signal(s) other than analog ramp signal(s), e.g. digitized ramp signals; for the sake of brevity alternative signal wave forms are not illustrated herein.

As shown in FIG. 1A, the VR controller 110 includes an error amplifier 112, coupled to two PWM controllers 113, 115. The VR controller 110 also includes a comparator 116 coupled to a generator and phase shift controller 114 and a summer 118. The comparator 116 generates a PSC signal. The error amplifier 112 compares the voltage at the output 137 of the VR 100 to a reference voltage 145, Vref. The output of the error amplifier 112, which provides the COMP signal, is coupled to the two PWM controllers 113, 115. The operation of the foregoing circuitry is described in U.S. patent application Ser. No. 11/318,081 (Filed May 17, 2006), which is hereby incorporated by reference. The VR controller has two outputs 170, 171 which respectively provide output signals, e.g. signals PWM1 and PWM2, or just signal PWM1 as is further discussed herein. The VR controller 110, for example, may be implemented with Intersil Corporation's ISL6334 or ISL6336 PWM controllers or incorporate circuitry like that found in such controllers. The datasheets for such controllers are hereby incorporated herein by reference.

The output current, I11 and I12, from each coupled inductor 141, 142 is measured by respective current sensors 151, 152. The first and second current sensors 151, 152 measure the current respectively flowing through the first and second inductors 151, 152. The current sensors 151, 152 may be implemented using a conventional DCR current sensing network. DCR current sensing is accomplished by measuring the DC voltage drop across a capacitor in series with a resistor; a series capacitor and resistor network is coupled in parallel with each inductor 140, 141. The capacitor and resistor values are selected so that the voltage across the capacitor is in phase with, and has the same amplitude profile, as the current of the inductor across which the series capacitor and resistor network is in parallel. DCR current sensing, and an alternative current sensing using Rds (On), are further described in Intersil Corporation Data Sheet FN9098.5 (May 12, 2005) which is entitled "Multi-Phase PWM Controller with Precision Rds (On) or DCR Differential Current Sensing for VR 10.X Application," which is incorporated by reference.

A first output current sensor 151 measures a first current flowing through inductor 141. A second output current sensor 152 measures a second current flowing through inductor L2 142. The first and second current measurements are summed by summer 118 that provides a signal, Iout, representative of the current (Iload) flowing through the load 160.

Signal Iout is then compared by comparator 116 with a threshold current level 139, Ithreshold. During normal VR 100 operation, the level of signal Iout is greater then the threshold current level 139 and the comparator 116 generates a phase shift control (PSC) signal waveform, e.g. with a zero volt level. Such PSC signal waveform causes the phase difference between PWM1 113 and PWM2 115 to be approximately one hundred and eighty degrees. However, in a light-load condition, the level of signal Iout will be less then the threshold current level 139 and the comparator 116 generates a PSC signal waveform that causes the phase difference between PWM1 113 and PWM2 115 to change by approximately one hundred and eighty degrees. Hence, the resulting phase difference between PWM1 signal 170 and PWM2 signal 171 is approximately zero degrees.

Note, the threshold current level 139, Ithreshold, may correspond to a very light-load condition rather then just a light-load condition. A very light load condition occurs when the value of Iload is less then the value of Iload at the light-load condition. Thus, the other light-load efficiency enhancement techniques mentioned herein may be used at light-load current levels above the threshold current level below which embodiments of the invention provide a benefit.

FIG. 2 illustrates exemplary waveforms 200 of signals generated by one embodiment of the multimode Voltage Regulator ("VR") 100 of FIG. 1A. FIG. 2 illustrates the use of dual ramps (e.g. RAMP1A and RAMP1B 310, 312) to generate a PWM signal (e.g. PWM 1 410). This technique is also illustrated in U.S. patent application Ser. No. 11/318,081 (Filed May 17, 2006). Alternatively, other techniques for using one or more ramps to create a PWM signal may be used; known conventional alternatives are not illustrated for the sake of brevity.

During normal operation (or "first operating mode") of the VR 100, the PSC signal waveform 210 is in a low voltage state. As a result, the generator and phase shift controller 114 generates four ramp signals, RAMP1A, RAMP1B 310, 312 and RAMP2A, RAMP2B 320, 322, where ramp signals RAMP1A and RAMP2A, and RAMP1B and RAMP2B are respectively out-of-phase, having approximately one hundred and eighty (180) degree phase difference. When the voltage level of the two sets of ramp signals 310, 312 and 320, 322 exceeds the voltage level at the Comp node, then PWM controllers 113, 115 generate PWM1 and PWM2 signals to have signal waveforms 410, 420 that are interleaved, i.e. approximately one hundred and eighty (180) degrees out of phase. The PWM signals 410, 420 operate the Drivers 121, 122 to turn the switches 131, 132 on and off in an alternating fashion. As a result the currents, I11 and I12, flowing through coupled inductors 140 have waveforms 151, 152 that are also interleaved. Such interleaving desirably reduces the magnitude of the ripple of Vout as compared to any phase difference other than approximately 180 degrees.

In the illustrated embodiment of the invention, the PWM signals 410, 420 are tri-level to enable DCM through drivers 120, 122. DCM is enabled through a driver only after the load current I1n of the corresponding phase transitions from a positive current to zero current, and the corresponding PWM signal is at its middle level. The zero level (e.g. zero volts) and high level (e.g. five volts) of the tri-level PWM signals 410, 420 instruct the drivers 120, 122 to operate in CCM. When the PWM1 signal 410 is at zero level, the lower FET 130 is turned on. When the PWM signal is at a high level, the upper FET 131 is turned on. FETs 132, 133 operate in an analogous fashion based upon the level of PWM1 signal 420. Other techniques for activating DCM and CCM may be used; known conventional alternatives are not illustrated for the sake of brevity. Embodiments of the invention may also be used in coupled inductor voltage regulators that do not operate in DCM, i.e. that only operate in CCM.

Under a light-load condition, the interleaved signals waveforms of I11 510 and I12 520 may be undesirable because they create a more complex inductor current waveform (i.e. the signal waveforms of I11+I12). Hence, implementation of diode emulation control circuitry and detection of zero current crossings may become more difficult. Also, the magnitude of the ripple on Vout may be undesirably increased.

Therefore, when a light-load condition occurs, such as at time T1 222, the PSC signal waveform 210 transitions to a high state. The PSC signal waveform 210 is provided to a generator and phase shift controller 114.

Upon the PSC signal waveform 210 transitioning to a high voltage level representative of a light-load condition, the VR 100 enters a second operating mode. The generator and phase shift controller 114 shifts the phase difference between the RAMP1A and B, and RAMP2A and B waveforms 310, 320 by approximately one hundred and eighty (180) degrees. This is illustrated in FIG. 2 at Time 220 T1 222.

This causes the PWM signal waveforms to shift by approximately one hundred and eighty (180) degrees so that the PWM signal waveforms 410, 420 are in phase, i.e., have a phase difference of approximately zero degrees. This is illustrated in FIG. 2 at Time 220 T1 222. As a result the currents, I11 and I12, flowing through coupled inductors 400 have waveforms 510, 520 that are also in-phase (i.e. have approximately zero degree phase difference) at Time 220 T1 222.

Because the inductor current waveforms 510, 520 after Time 220 T1 222 are similar to those found in VRs employing non-coupled inductors, diode emulation control circuitry used in non-coupled inductor VRs may be used by the VR 100 during light-load operation. Also, detection of zero current crossings can more accurately be detected, in part due to reduced noise because of the more conventional current waveform. This results in enhanced VR efficiency. The magnitude of the ripple at Vout is also reduced under light-load conditions.

To further enhance the performance of the VR 100, the current threshold level 139, Ithreshold, may be modified to improve efficiency and minimize output voltage ripple. The value of the current threshold level 139, Ithreshold, may be stored in memory (not shown), e.g. in the VR controller 110.

Figure 1B:
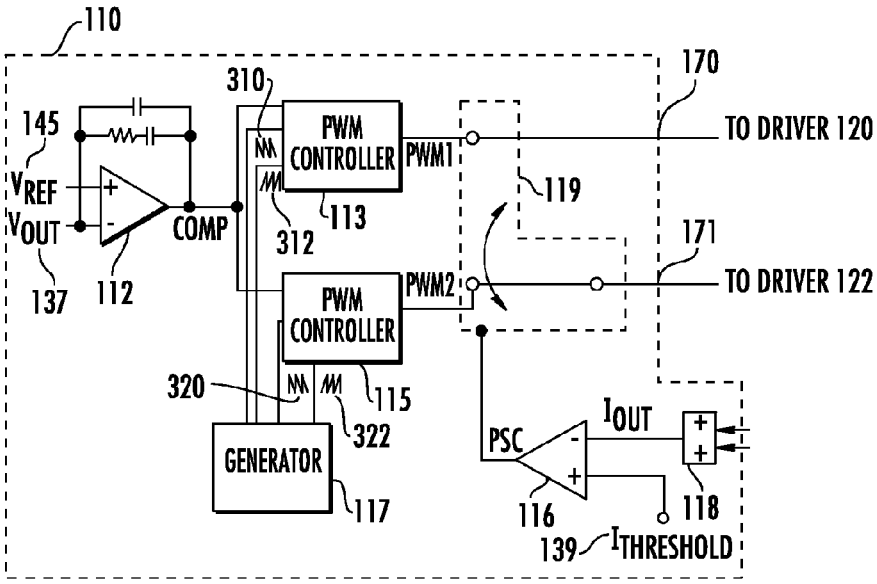
FIG. 1B illustrates a schematic of an alternate embodiment of a voltage regulator controller whose operation varies based upon load conditions.

FIG. 1B illustrates an alternate embodiment of a multimode voltage regulator ("VR") controller 110. In this alternate embodiment, the generator and phase shift controller 114 is replaced by a generator 117. Like the generator and phase shift controller 114, the generator 117 generates signal(s), e.g., ramp signal(s). However, unlike a generator and phase shift controller 114, the generator 117 does not perform phase shifting. Rather, as illustrated in FIG. 1B, the phase is shifted by the use of a switch 119 coupled between the outputs of the PWM controllers 113, 115 and the VR controller outputs 170, 171.

The alternate embodiment of the VR controller 110 includes a switch 119, e.g. a single pole, double throw ("SPDT") switch, coupled to the outputs of both PWM controllers 113, 115 and both drivers 120, 122. The SPDT switch 119 may contain buffer and control logic circuitry. The output of comparator 116 is coupled to the SPDT switch 119. One or more switch(es), e.g. SPDT or other configurations of poles and throws, may be required for VRs having more than two phases.

A change in the PSC signal, generated by comparator 116, toggles the state of switch 119. Under normal VR 100 operating conditions, the switch 119 couples the PWM1 signal from the output of PWM controller 113 to the input of driver 120, and couples the PWM2 signal from the output of PWM controller 115 to the input of driver 122. As a result, the PWM signals provided to drivers 120, 122 are dissimilar, and thus out-of-phase.

However, when the VR 100 operates under light-load conditions, the PSC signal toggles the switch 119 so that the PWM1 signal from the output of PWM controller 113 is provided to the input of both drivers 120, 122. The output of PWM controller 115 is terminated by a termination, e.g. a resistor, an open circuit or another impedance having resistive, capacitive, and/or inductive components.

As a result, the PWM signals provided to drivers 120, 122 are the same, and thus in-phase. The benefit of such in-phase signals is further described herein.

The PWM2 signal from the output of PWM controller 115 is provided to neither driver 120, 122. In another embodiment, the output of comparator 116 may also be coupled to PWM controller 115. When the VR 100 operates under light-load conditions, the PSC signal would disable PWM controller 115, e.g. turning it off, to further conserve power and reduce noise.

An embodiment of the present invention is applicable to VRs with N-coupled inductors, and with PWM VRs having fixed and variable frequencies. To maintain higher efficiency at lower loads, i.e. reduced VR power output, the PWM frequency may be reduced. PWM frequency, for example, may be adjusted by varying the frequency of RAMP1 and RAMP2 waveforms in the generator and phase shift controller.

FIG. 3 illustrates an exemplary system 300, e.g. a computer or telecommunications system. An embodiment of the VR 100 of FIG. 1 may be incorporated into the system 300. The system 300 includes a power source 301 coupled to the VR 303. The power source 301 may be a conventional AC to DC power supply or battery; other power sources may be used but are excluded for the sake of brevity. The load 160 may be one or more of a processor 305, memory 309, a bus 307, or a combination of two or more of the foregoing. The processor 305 may be a one or more of a microprocessor, microcontroller, embedded processor, digital signal processor, or a combination of two or more of the foregoing. The processor 305 is coupled by a bus 307 to memory 309. The memory 309 may be one or more of a static random access memory, dynamic random access memory, read only memory, flash memory, or a combination of two or more of the foregoing. The bus 307 may be one or more of an on chip (or integrated circuit) bus, e.g. an Advanced Microprocessor Bus Architecture ('AMBA'), an off chip bus, e.g. a Peripheral Component Interface ('PCI') bus or PCI Express ('PCIe') bus, or some combination of the foregoing. The processor 305, bus 307, and memory 309 may be incorporated into one or more integrated circuits and/or other components.

Although one or more embodiments of the present invention have been described in considerable detail with reference to certain disclosed versions thereof, other versions and variations are possible and contemplated. For example, an embodiment may be implemented with more than two coupled inductors and phases. The capacitance 143, Cout, may be implemented with one or more capacitors which, for example, can be leaded, leadless, or a combination thereof. Also, the circuits and/or logic blocks described herein may be implemented as discrete circuitry and/or integrated circuitry and/or software, and/or in alternative configurations. For example, additional components, e.g. the Drivers 120, 122 and switches 130, 131, 132, 133 may be integrated with the PWM controller into a single integrated circuits. Alternatively, a driver and a switch may be respectively be integrated into a single integrated circuit or package. Further alternatively, some components illustrated as being part of the VR controller 110 may be implemented discretely, i.e. not part of a PWM controller integrated circuit. The illustrated embodiments show VRs that are buck converters. Other embodiments of the invention may be implemented with other VR topologies, e.g. boost converters or buck-boost converters, a constant on time implementation, and combinations thereof. Finally, those skilled in the art should appreciate that they can readily use the disclosed conception and specific embodiments as a basis for designing or modifying other structures for carrying out the same purposes without departing from the spirit and scope of the invention.

What is claimed is:

1. A controller for a voltage regulator, comprising:

a first controller to generate a first signal to drive a first switch of the voltage regulator;

*a first inductor coupled to an output of the first switch;* a second controller to generate a second signal to drive a second switch of the voltage regulator;

*a second inductor coupled to an output of the second switch, the first inductor and the second inductor inductively coupled;* and a comparator coupled to an output of the voltage regulator, an input of the first controller and an input of the second controller, wherein the comparator is operable to determine if a light-load condition exists, and if a light-load condition exists, generate a third signal to adjust a phase difference between the first signal and the second signal so that the first signal and the second signal are approximately in-phase.

2. The controller of claim 1, wherein the first switch comprises a transistor switch.

3. The controller of claim 1, further comprising a generator and phase shift controller coupled to an output of the comparator, the input of the first controller and the input of the second controller.

4. The controller of claim 1, wherein if a light-load condition does not exist, the comparator is further operable to generate a fourth signal to adjust the phase difference so that the first signal and the second signal are substantially out-of-phase.

5. The controller of claim 1, wherein the first signal comprises a Pulse Width Modulated (PWM) signal.

6. The controller of claim 1, wherein one input of the comparator is coupled to an output current of the voltage regulator, and a second input of the comparator is coupled to a threshold current source.

7. A voltage regulator, comprising:

a first controller to generate a first signal;

a second controller to generate a second signal;

a switch to receive the first signal at a first input and the second signal at a second input;

a first inductor coupled to a first output of the switch;

a second inductor coupled to a second output of the switch, the first inductor and second inductor inductively coupled; and a comparator, a first input of the comparator coupled to receive a signal indicative of a current in the first inductor and a signal indicative of a current in the second inductor, a second input of the comparator coupled to receive a threshold current signal, and an output of the comparator coupled to a third input of the switch, wherein the comparator is operable to compare a value of the signal indicative of the current in the first inductor and the signal indicative of the current in the second inductor with a value of the threshold current signal to determine if a light-load condition exists, and if a light-load condition exists, generate a third signal to cause the switch to switch at least one of the first signal and the second signal so that a signal at the first output of the switch is approximately in-phase with a signal at the second output of the switch.

8. The voltage regulator of claim 7, wherein the light-load condition exists if the value of the signal indicative of the current in the first inductor and the signal indicative of the current in the second inductor is less than the value of the threshold current signal.

9. The voltage regulator of claim 7, wherein the switch comprises a single pole, double throw switch.

10. The voltage regulator of claim 7, further comprising:

a first current sensor coupled to the first inductor;

a second current sensor coupled to the second inductor; and a summer, wherein a first input of the summer is coupled to the first current sensor, a second input of the summer is coupled to the second current sensor, and an output of the summer is coupled to the first input of the comparator.

11. The voltage regulator of claim 7, wherein the signals indicative of the current in the first inductor and the second inductor represent a load current for the voltage regulator.

12. A system, comprising:

a voltage regulator;

a power source coupled to an input of the voltage regulator; and a load coupled to an output of the voltage regulator, the voltage regulator including:

a first controller to generate a first signal to drive a first switch of the voltage regulator;

*a first inductor coupled to an output of the first switch;* a second controller to generate a second signal to drive a second switch of the voltage regulator;

*a second inductor coupled to an output of the second switch, the first inductor and the second inductor inductively coupled;* and a comparator coupled to an output of the voltage regulator, an input of the first controller and an input of the second controller, wherein the comparator is operable to determine if a light-load condition exists, and if a light-load condition exists, generate a third signal to shift a phase of at least one of the first signal and the second signal so that a phase difference between the first signal and the second signal is approximately zero degrees.

13. The system of claim 12, wherein the load comprises at least one of a processor, a memory, and a bus.

14. The system of claim 12, wherein if a light-load condition does not exist, the comparator is further operable to generate a fourth signal to shift the phase of the at least one of the first signal and the second signal so that the phase difference between the first signal and the second signal is substantially greater than zero degrees.

15. A method for controlling a voltage regulator, comprising:

generating a first drive signal for a first phase of the voltage regulator;

generating a second drive signal for a second phase of the voltage regulator;

sensing a first current flowing through the first phase of the voltage regulator;

sensing a second current flowing through the second phase of the voltage regulator;

summing the first sensed current and the second sensed current;

comparing a value of the sum with a threshold value; and if the sum is less than the threshold value, adjusting a phase difference between the first drive signal and the second drive signal so that the first drive signal and the second drive signal are approximately in-phase.

16. The method of claim 15, wherein if the sum is not less than the threshold value, adjusting the phase difference between the first drive signal and the second drive signal so that the first drive signal and the second drive signal are substantially out-of-phase.

17. The method of claim 15, further comprising inductively coupling a first inductor in the first phase to a second inductor in the second phase.

18. The method of claim 15, wherein the adjusting comprises generating a phase-shift control signal.

19. The method of claim 15, wherein the generating the first drive signal comprises generating a PWM signal.

20. The method of claim 15, wherein the comparing comprises comparing a value of a load current with the threshold value.

21. A system, comprising:

a voltage regulator having at least two phases *and at least two inductively-coupled inductors in the at least two phases*;

a power source coupled to an input of the voltage regulator; and a load coupled to an output of the voltage regulator, the voltage regulator including:

a first controller to generate a first signal;

a second controller to generate a second signal; and a comparator coupled to an output of the voltage regulator, wherein the comparator is operable to determine if a light-load condition exists, and if a light-load condition exists, generate a third signal so that that the voltage regulator uses at least one of the first signal and the second signal to provide in-phase signals to drive the at least two phases *including the at least two inductively-coupled inductors* and provide the output for the load.

22. The system of claim 21, wherein generating a third signal comprises generating a signal that adjusts the phase of at least one of the first and second signals to be approximately in-phase.

23. The system of claim 21, wherein generating a third signal comprises generating a signal that selects one of the first signal and the second signal to drive the at least two phases.

24. A method for controlling a voltage regulator having at least two phases, comprising:

generating a first drive signal for the voltage regulator;

generating a second drive signal for the voltage regulator;

*sensing a first current flowing through a first inductor in a first phase of the voltage regulator;*

*sensing a second current flowing through a second inductor in a second phase of the voltage regulator, the first inductor and the second inductor inductively coupled;*

*responsive to the sensing the first current and the second current,* determining whether a light-load condition exists; and if a light load condition exists, driving the at least two phases utilizing the first drive signal and the second drive signal so that the first drive signal and the second drive signal are approximately in-phase.

*25. A method for controlling a multi-phase coupled-inductor voltage converter, comprising:*

*generating a plurality of signals utilized for driving a plurality of phases of the multi-phase coupled-inductor voltage converter;*

*determining whether a light-load condition exists; and*

*if a light load condition exists, driving the plurality of phases so that the plurality of signals are approximately in-phase.*

*26. The method of claim 25, wherein if a light-load condition does not exist, driving the plurality of phases so that the plurality of signals are substantially out-of-phase.*

*27. The method of claim 25, wherein the determining comprises:*

*sensing a plurality of currents flowing in the plurality of phases;*

*summing the sensed plurality of currents; and*

*comparing a value of the sum with a threshold value.*

*28. The method of claim 27, wherein the generating comprises:*

*responsive to the comparing, generating a phase shift control signal; and*

*if the value of the sum is less than the threshold value, the phase shift control signal causing the driving of the plurality of phases so that the plurality of signals are approximately in-phase.*

*29. The method of claim 28, wherein if the value of the sum is greater than the threshold value, the phase shift control signal causing the driving of the plurality of phases so that the plurality of signals are substantially out-of-phase.*

*30. The method of claim 25, wherein the driving comprises driving a plurality of transistor switches.*

*31. The method of claim 25, wherein the multi-phase coupled-inductor voltage converter comprises a voltage regulator including N mutual-coupled inductors.*

*32. The method of claim 25, wherein the multi-phase coupled-inductor voltage converter includes more than two mutual-coupled inductors and more than two phases.*

* * * * *